(12) United States Patent
Sasaki

(10) Patent No.: US 8,169,646 B2
(45) Date of Patent: May 1, 2012

(54) IMAGE-PROVIDING APPARATUS AND CONTROL METHOD THEREOF, PRINTING APPARATUS AND CONTROL METHOD THEREOF, AND PRINTING SYSTEM

(75) Inventor: Futoshi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1105 days.

(21) Appl. No.: 12/035,915

(22) Filed: Feb. 22, 2008

(65) Prior Publication Data

US 2008/0231870 A1  Sep. 25, 2008

(30) Foreign Application Priority Data

Mar. 19, 2007  (JP) ................................. 2007-071200

(51) Int. Cl.
*G06F 3/12* (2006.01)
(52) U.S. Cl. ...................................... 358/1.15; 382/276
(58) Field of Classification Search .......... 358/1.1–1.16; 382/276
See application file for complete search history.

(56) References Cited

U.S. PATENT DOCUMENTS

| | | | |
|---|---|---|---|
| 5,832,110 A * | 11/1998 | Hull | 382/168 |
| 7,423,671 B2 | 9/2008 | Kiso | |
| 7,437,017 B2 | 10/2008 | Aihara | |
| 7,564,487 B2 | 7/2009 | Kato et al. | |
| 7,738,734 B2 | 6/2010 | Aihara | |
| 2003/0156196 A1 | 8/2003 | Kato et al. | |
| 2004/0066969 A1 | 4/2004 | Aihara | |
| 2004/0165202 A1* | 8/2004 | Nakagawa | 358/1.9 |
| 2005/0078202 A1 | 4/2005 | Kiso | |
| 2005/0219555 A1 | 10/2005 | Onuma et al. | 358/1.1 |
| 2007/0195362 A1 | 8/2007 | Yamada et al. | 358/1.15 |
| 2007/0223900 A1* | 9/2007 | Kobayashi et al. | 396/50 |
| 2009/0010541 A1 | 1/2009 | Aihara | |

FOREIGN PATENT DOCUMENTS

| | | |
|---|---|---|
| CN | 1685704 A | 10/2005 |
| CN | 1825889 A | 8/2006 |
| JP | 05-328096 A | 12/1993 |
| JP | 05-344318 A | 12/1993 |
| JP | 2002-157573 A | 5/2002 |
| JP | 2004-046632 A | 2/2004 |
| JP | 2005-110000 A | 4/2005 |

OTHER PUBLICATIONS

Aug. 17, 2011 Chinese Official Action in Chinese Patent Appln. No. 200810087127.6.

* cited by examiner

*Primary Examiner* — Benny Q Tieu
*Assistant Examiner* — Michael Tzeng
(74) *Attorney, Agent, or Firm* — Fitzpatrick, Cella, Harper & Scinto

(57) ABSTRACT

A composite image is generated by compositing blank regions generated by tilt correction with achromatic pixels or pixels contained in the non-overlapping regions that do not overlap with the region of the original image as a result of tilt correction. The data of this composite image, which is used as image data used for printing, is provided to a printing apparatus having an automatic correction feature. As a result, variation in correction results due to the amount of tilt correction is minimized when images corrected for tilt are automatically corrected and printed.

5 Claims, 10 Drawing Sheets

IMAGE-PROVIDING APPARATUS AND CONTROL METHOD THEREOF, PRINTING APPARATUS AND CONTROL METHOD THEREOF, AND PRINTING SYSTEM

BACKGROUND OF THE INVENTION

1. Field of the Invention

The present invention relates to an image-providing apparatus and control method thereof, a printing apparatus and a control method thereof, as well as to a printing system obtained by interconnecting the image-providing apparatus and the printing apparatus.

2. Description of the Related Art

In the past, a personal computer (PC) was necessary when printing image data held in a digital still camera (hereinafter DSC) or another image-providing apparatus using a printer or another printing apparatus. However, in recent years, it has become increasingly common to use the so-called direct printing system (hereinafter "direct printing system"), in which a DSC and a printer are interconnected through a communication interface such as a USB, etc., and image data from the OSC is sent directly to the printer for printing.

Standards related to communication between a DSC and a printer, which are used to implement such a direct printing system, stipulate that image files in JPEG format or TIFF format are to be transferred from the DSC to the printer.

In recent years, there have been implemented printers having features used for automatically correcting image brightness, contrast, white balance, etc., as a result of which it has also become possible to obtain automatically corrected image output simply by outputting image data from a DSC to such a printer.

The image processing features that printers are equipped with include red-eye correction, backlight compensation, noise reduction, etc., and their number tends to grow every year. On the other hand, there appeared DSCs equipped with similar image correction features, as a result of which image data produced by image correction on the DSC side is outputted to printers as well.

In certain situations, captured images are obtained, in which the height of the sea horizon or land horizon, building outlines and other things that are supposed to be horizontal varies (is tilted) at the right and left edges of the images.

The known methods used for modifying such failed images include, for example, a method wherein printing is performed by rotating an image so as to make it horizontal and selecting a cropping operation such that blank regions generated by the rotation are not printed.

In the direct printing system, the crop-and-print feature is implemented by sending the original image, cropping position information, and "bordered/borderless" layout information from the DSC to the printer and performing image processing based on this information on the printer side.

Most automatic image correction processing commonly employs histograms generated from image data and Exif information contained in image files as data used for the adjustment of brightness, contrast, white balance, etc. The problem is that, for this reason, when images that have undergone image correction in the DSC are output to a printer equipped with the automatic image correction feature, the printing results end up being different from cases in which they are output to the printer without image correction in the DSC.

The problem is that when, for example, a cropping area is designated and sent to a printer during a crop-and-print operation, the brightness and contrast do not remain stable because even in case of regions cropped from the same image, the pixel histogram ends up being different depending on the cropping area.

Moreover, when printing images produced by a rotation process (tilt correction) in the DSC, images obtained by rotation are sent to the printer along with cropping information. However, when image processing is performed on the printer side, empty regions produced by rotation, which cannot be interpolated (blank regions), are included therein, which makes it impossible to obtain correct image histograms. Furthermore, because the size of the blank regions varies depending on the amount of rotation, a histogram changes depending on the magnitude of the amount of rotation even when the same image is printed. The problem that occurs as a result is that images automatically corrected by the printer have unstable brightness, contrast and color tint.

SUMMARY OF THE INVENTION

The present invention was made with account taken of such prior-art problems and it is an object of the invention to provide an image-providing apparatus, a printing apparatus, and a method for controlling the same, as well as a printing system that makes it possible to minimize variation in correction results due to the amount of tilt correction when images corrected for tilt are automatically corrected and printed.

According to an aspect of the present invention, there is provided an image-providing apparatus providing image data used for printing to a printing apparatus, comprising: generation unit adapted to generate image data used for printing from data of an original image; and communication unit adapted to provide the image data used for printing to a connected printing apparatus, wherein, when the original image is rotated during generation of the image data used for printing, the generation unit, along with obtaining a rotated image by rotating the original image, generates image data used for printing by including achromatic pixels or pixels from non-overlapping regions that do not overlap with a region corresponding to the original image within the rotated image in blank regions of the rotated image.

According to another aspect of the present invention, there is provided an image-providing apparatus providing image data used for printing to a printing apparatus, comprising: generation unit adapted to generate image data used for printing from data of an original image; and communication unit adapted to provide the image data used for printing to a connected printing apparatus, wherein, when the original image is rotated during generation of the image data used for printing, the generation unit, along with obtaining a rotated image by rotating the original image, generates a histogram from the data of the original image and generates the image data used for printing using the information of the histogram and the rotated image.

According to a further aspect of the present invention, there is provided an image-providing apparatus providing image data used for printing to a printing apparatus, comprising: generation unit adapted to generate image data used for printing from data of an original image; and communication unit adapted to provide the image data used for printing to a connected printing apparatus, wherein, when the original image is rotated during generation of the image data used for printing, the generation unit, along with obtaining a rotated image by rotating the original image, generates the image data used for printing using the rotated image and information describing the way the original image was rotated to obtain the rotated image.

According to yet further aspect of the present invention, there is provided an image-providing apparatus providing image data used for printing to a printing apparatus, comprising: generation unit adapted to generate image data used for printing from data of an original image; correction unit adapted to perform automatic correction of image data; and communication unit adapted to provide the image data used for printing to a connected printing apparatus, wherein, when the original image is rotated during generation of the image data used for printing, the generation unit obtains a rotated image by rotating the original image and, along with that, if automatic image correction in the printing apparatus has been selected in the print setting used when printing the image data used for printing with the printing apparatus, deselects the automatic image correction selection in the print setting and generates, as the image data used for printing, a rotated image obtained by applying image correction using the correction unit.

According to still further aspect of the present invention, there is provided a printing apparatus, comprising: reception unit adapted to receive data of a rotated image obtained by rotating an original image and a histogram of the original image from an image-providing apparatus; correction unit adapted to correct the data of the rotated image based on the histogram; and output unit adapted to produce printed output using the data of the rotated image corrected by the correction unit.

According to yet further aspect of the present invention, there is provided a printing apparatus, comprising: reception unit adapted to receive data of a rotated image obtained by rotating an original image and information describing contents of a rotation process applied to the original image in order to obtain the rotated image from an image-providing apparatus; identification unit adapted to identify a blank region contained in the rotated image from the information describing the contents of the rotation process and the size of the rotated image; correction unit adapted to correct the data of the rotated image without using information of pixels of the blank region within the rotated image; and output unit adapted to produce printed output using the data of the rotated image corrected by the correction unit.

According to yet further aspect of the present invention, there is provided a printing system in which an image-providing apparatus and a printing apparatus are mutually communicatable, wherein the image-providing apparatus comprises: generation unit adapted to generate image data used for printing from data of an original image which, when the original image is rotated during generation of the image data used for printing, obtains a rotated image by rotating the original image and, at the same time, generates a histogram from the data of the original image and generates the image data used for printing using the rotated image and information of the histogram; and communication unit adapted to provide the image data used for printing to the printing apparatus, and the printing apparatus comprises: reception unit adapted to receive the image data used for printing from the image-providing apparatus; correction unit adapted to correct the data of the rotated image based on the information of the histogram of the original image and the data of the rotated image contained in the image data used for printing; and output unit adapted to produce printed output using the data of the rotated image corrected by the correction unit.

According to yet further aspect of the present invention, there is provided a printing system in which an image-providing apparatus and a printing apparatus are mutually communicable, wherein the image-providing apparatus comprises: generation unit adapted to generate image data used for printing from data of an original image which, when the original image is rotated during generation of the image data used for printing, obtains a rotated image by rotating the original image and, at the same time, generates the image data used for printing using the rotated image and information describing the way the original image was rotated to obtain the rotated image; and communication unit adapted to provide the image data used for printing to a connected printing apparatus, and the printing apparatus comprises: reception unit adapted to receive the image data used for printing from the image-providing apparatus; identification unit adapted to identify a blank region contained in the rotated image from information describing contents of the rotation process and the size of the rotated image contained in the image data used for printing; correction unit adapted to correct the data of the rotated image without using information of pixels of the blank region within the rotated image contained in the image data used for printing; and output unit adapted to produce printed output using the data of the rotated image corrected by the correction unit.

According to yet further aspect of the present invention, there is provided a printing system in which an image-providing apparatus and a printing apparatus are mutually communicatable, wherein the image-providing apparatus comprises: generation unit adapted to generate image data used for printing from data of an original image, which, when the original image is rotated during generation of the image data used for printing, obtains a rotated image by rotating the original image and, along with that, generates image data used for printing by including achromatic pixels or pixels from non-overlapping regions that do not overlap with a region corresponding to the original image within the rotated image in a blank region of the rotated image, and communication unit adapted to provide the image data used for printing to a connected printing apparatus, and the printing apparatus comprises: automatic correction unit adapted to automatically correct the image data used for printing.

According to yet further aspect of the present invention, there is provided a control method for an image-providing apparatus providing image data used for printing to a printing apparatus, comprising the steps of: generating image data used for printing from data of an original image, and effecting communication to provide the image data used for printing to a connected printing apparatus by communication unit, wherein, when the original image is rotated during generation of the image data used for printing, the generating step involves obtaining a rotated image by rotating the original image and, along with that, generating image data used for printing by including achromatic pixels or pixels from non-overlapping regions that do not overlap with a region corresponding to the original image within the rotated image in a blank region of the rotated image.

According to yet further aspect of the present invention, there is provided a control method for an image-providing apparatus providing image data used for printing to a printing apparatus, comprising the steps of: generating image data used for printing from data of an original image, and effecting communication to provide the image data used for printing to a connected printing apparatus by communication unit, wherein, when the original image is rotated during generation of the image data used for printing, the generating step involves obtaining a rotated image by rotating the original image and, along with that, generating a histogram from data of the original image and generating the image data used for printing using information of the histogram and the rotated image.

According to yet further aspect of the present invention, there is provided a control method for an image-providing apparatus providing image data used for printing to a printing apparatus, comprising the steps of: generating image data used for printing from data of an original image, and effecting communication to provide the image data used for printing to a connected printing apparatus by communication unit, wherein, when the original image is rotated during generation of the image data used for printing, the generating step involves obtaining a rotated image by rotating the original image and, along with that, generating the image data used for printing using the rotated image and information describing the way the original image was rotated to obtain the rotated image.

According to further aspect of the present invention, there is provided a control method for an image-providing apparatus having correction unit adapted to perform automatic correction of image data and providing image data used for printing to a printing apparatus, comprising the steps of: generating image data used for printing from data of an original image; and effecting communication to provide the image data used for printing to a connected printing apparatus, wherein, when the original image is rotated during generation of the image data used for printing, the generating step obtains a rotated image by rotating the original image and, along with that, if automatic image correction in the printing apparatus has been selected in the print setting used when printing the image data used for printing with the printing apparatus, deselects the automatic image correction selection in the print setting and generates, as the image data used for printing, a rotated image obtained by applying image correction using the correction unit.

According to yet further aspect of the present invention, there is provided a control method for a printing apparatus comprising the steps of: receiving data of a rotated image obtained by rotating an original image and a histogram of the original image from an image-providing apparatus by receiving unit; correcting the data of the rotated image based on the histogram; and producing printed output by output unit using the data of the rotated image corrected in the correction step.

According to yet further aspect of the present invention, there is provided a control method for a printing apparatus comprising the steps of: receiving data of a rotated image obtained by rotating an original image and information describing contents of a rotation process applied to the original image in order to obtain the rotated image from an image-providing apparatus by receiving unit; identifying a blank region contained in the rotated image from the information describing the contents of the rotation process and the size of the rotated image; correcting the data of the rotated image without using information of pixels of the blank region within the rotated image; and producing printed output by output unit using the data of the rotated image corrected in the correction step.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

The present embodiment illustrates a case, in which direct printing is implemented using a PictBridge-compatible procedure in a printing system comprising a digital camera (DSC) as an example of an image-providing apparatus, and a printer as an example of a printing apparatus. However, printing systems, to which the present invention can be applied, are not limited to this specific configuration and procedure.

Figure 1:
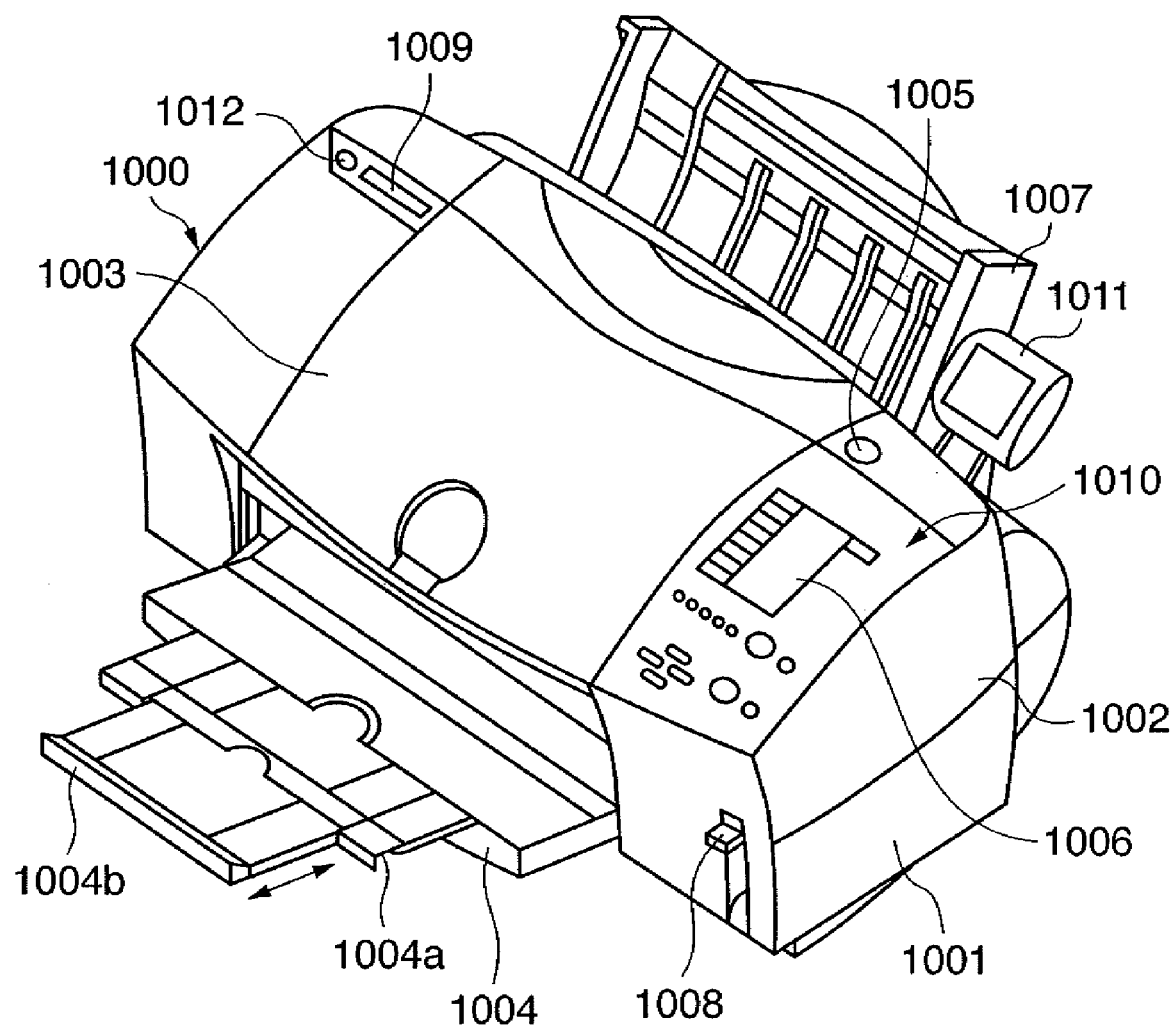
FIG. 1 is a perspective view illustrating an exemplary general view of a direct printing-compatible printer according to an embodiment of the present invention.

FIG. 1 is a general perspective view of a direct printing-compatible printer 1000 according to an embodiment of the present invention. This printer 1000 has the usual PC printer functionality used for receiving data from a host computer (PC) and printing it. In addition, the printer 1000 is equipped with a feature allowing direct reading and printing of image data stored onto a memory card or another storage medium, or receiving and printing image data from a digital camera or a PDA, etc.

In FIG. 1, the main body, which constitutes the outside shell of the printer 1000 according to the present embodiment, has an exterior cladding member with a bottom case 1001, a top case 1002, an access cover 1003, and an output tray 1004. Also, the bottom case 1001 forms substantially the bottom half of the printer 1000 and the top case 1002 forms substantially the top half of the main body. Various mechanisms, which will be described later, are contained within the space formed by compositing the bottom case 1001 with the top case 1002. Furthermore, the output tray 1004, one end whereof is rotatably held in the bottom case 1001, can, on rotation, open and close an opening formed in the front end portion of the bottom case 1001.

For this reason, when printing is effectuated, the output tray 1004 is rotated forward, leaving the opening in an open state, as a result of which freshly printed print media (including regular paper, special paper, resin sheets, etc.) can be ejected. Moreover, the ejected print media can be loaded into the output tray 1004. In addition, two auxiliary trays, 1004a and 1004b, are contained within the output tray 1004 and, if necessary, the size of the output tray can be adjusted to three stages by extending the auxiliary trays 1004b, 1004a.

The access cover 1003 is constructed such that one end thereof is rotatably held in the top case 1002 to permit the opening and closing of an opening formed in the upper surface. A printhead cartridge (not shown) or an ink tank (not shown), etc., which are held inside, can be replaced by opening the access cover 1003. It should be noted that a protrusion, not shown here, which rotates a cover opening/closing lever provided in the main body when the access cover 1003 is opened and closed, is formed on the back side of the access cover 1003. Accordingly, the opened/closed status of the access cover 1003 can be detected by detecting the rotational position of the cover opening/closing lever using a microswitch, etc.

Moreover, a power key 1005 is provided on the upper surface of the top case 1002. In addition, an operator panel 1010, which is equipped with a display 1006 and various key switches, etc., is provided on the right side of the top case 1002. The configuration of this operator panel 1010 will be described in detail below by referring to FIG. 2.

1007 is an automatic feeder unit, which automatically feeds sheet-type print media into the main body of the apparatus. 1008 is a paper gap selection lever, that is, a lever used to adjust the gap between the print head and the print media. 1009, which is a card slot, makes it possible for image data stored on a memory to be read from the memory card inserted there. A viewing unit (display) 1011, which can be attached to, and detached from, the main body of the printer 1000, is used to display the images of each frame, thumbnail images, etc. when specifying images intended for printing among the images stored on the memory card. 1012 is a USB terminal used for connecting a digital camera, which is described below. Moreover, a USB connector used for connecting a personal computer (PC) is provided on the rear surface of the printer 1000.

Figure 2:
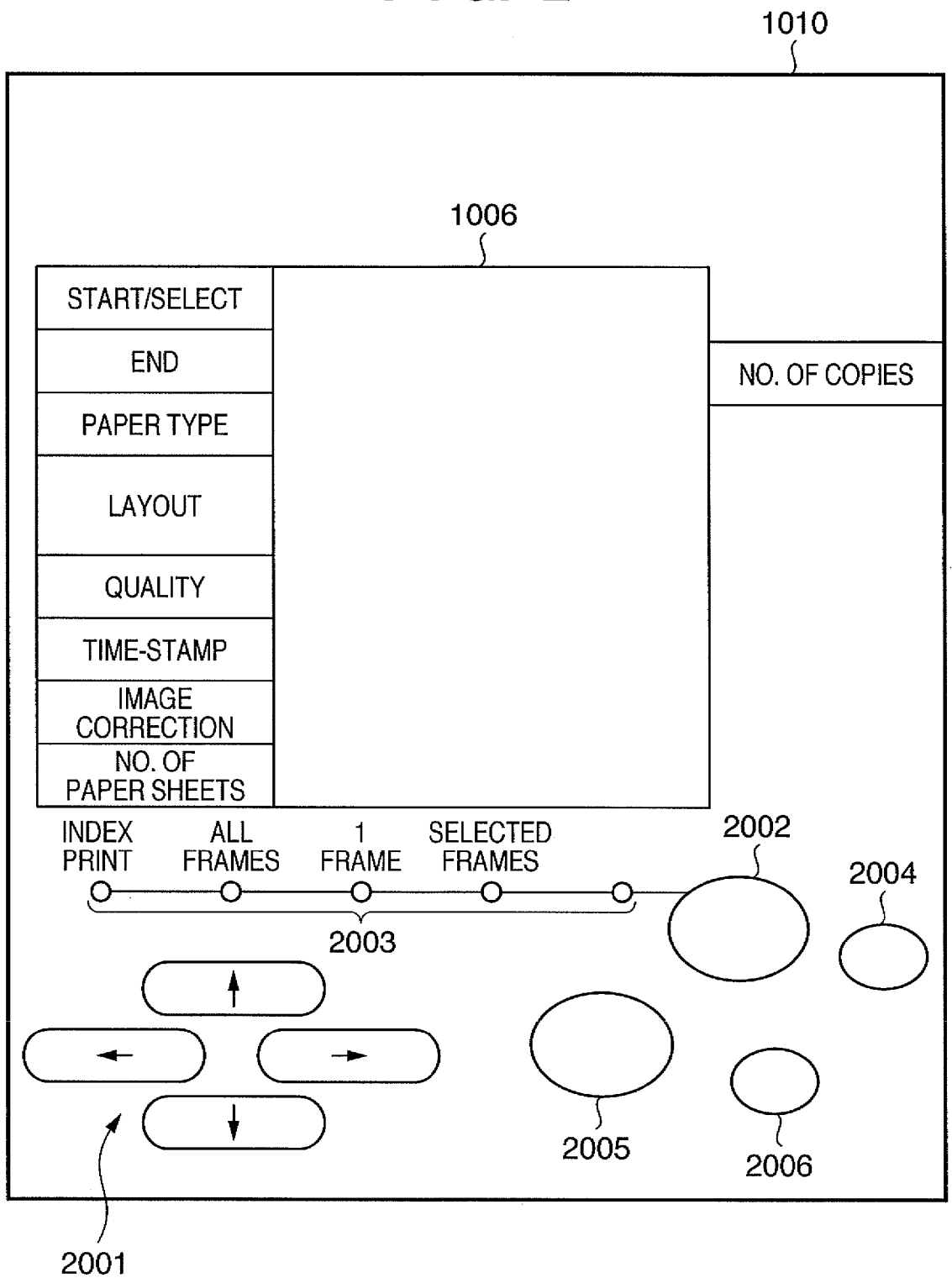
FIG. 2 is a diagram illustrating an exemplary general view of a printer operator panel according to an embodiment of the present invention.

FIG. 2 is a general view of the operator panel 1010 of the printer 1000 according to the present embodiment.

In FIG. 2, menu items used for configuring data related to the items being printed are displayed on the display 1006, on the right- and left-hand side thereof. The items that are displayed here can be exemplified, for instance, by the following items: the starting number of the photographic images to be printed among multiple photographic image files, selected frame numbers (beginning frame selection/print frame selection), the number of the final photograph at which printing should be terminated (end); the number of copies to be printed (number of copies), the type of print media used for printing (paper media type), the settings for the number of photographs printed on a single sheet of print media (layout), print quality level selection (quality), selection indicating whether shooting dates are to be printed (date stamp); selection indicating whether images are to be printed after correction (image correction), the display of the number of sheets of print media required for printing (number of paper sheets), etc.

These items can be selected or picked using a cursor key, 2001. 2002 is a mode key which, whenever depressed, permits switching between different types of printing (index print, print all frames, print one frame, print selected frame, etc.), with the corresponding LEDs 2003 lit depending on the type. 2004 is a maintenance key, that is, a key used to issue instructions regarding printer maintenance, such as print head cleaning, etc. 2005 is a print start key, that is, a key used when issuing an instruction to start printing or issuing an instruction to apply maintenance settings. 2006 is a print stop key, that is, a key used to issue an instruction to stop printing or maintenance.

Figure 3:
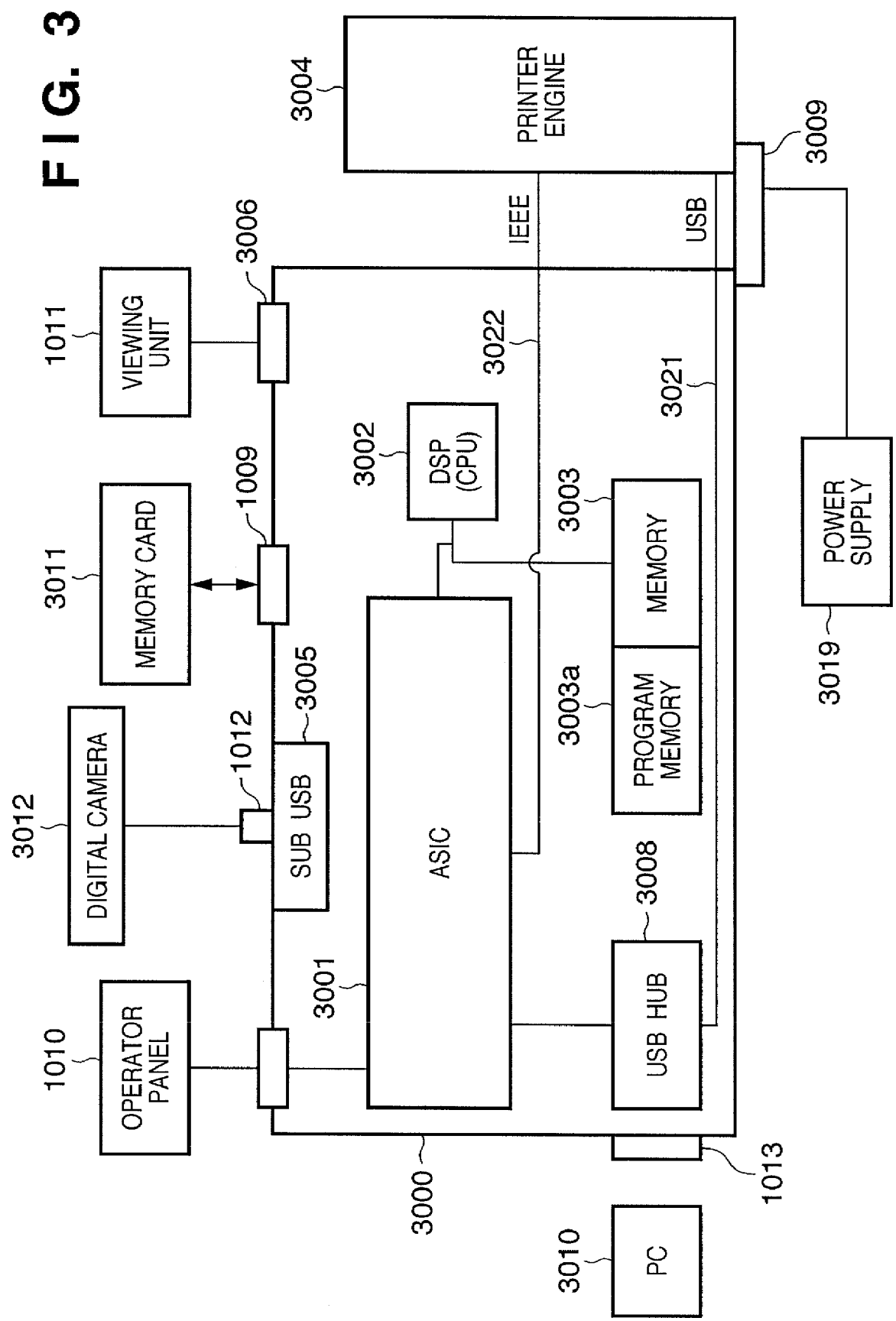
FIG. 3 is a block diagram illustrating an exemplary configuration of the main portion related to printer control according to an embodiment of the present invention.

FIG. 3 is a block diagram illustrating the configuration of the main portion related to printer control according to the present embodiment. In FIG. 3, the same reference numerals are assigned to components identical to those of the above-described figures and an explanation thereof is not given.

In FIG. 3, 3000 shows a control unit (control board). 3001 shows an ASIC (application-specific custom LSI chip). 3002 is a DSP (digital signal processor), which contains a CPU and is responsible for various kinds of control processing and image processing, such as conversion from luminance signals (RGB) to density signals (CMYK), scaling, gamma-conversion, error diffusion, etc., which will be described hereinbelow. The DSP 3002 provides functionality necessary for automatic image correction (automatic image correction function). 3000 is a memory, which has a program memory 3003a used for storing the control program of the DSP (CPU) 3002, a RAM area used for program storage during execution, and a memory area, which operates as a work memory used for storing image data, etc. 3004 is a printer engine, which has an inkjet printer-type printer engine installed therein for printing color images using multiple color inks.

3005 is a USB connector serving as a port for connecting a DSC 3012. 3006 is a connector for connecting the viewing unit 1011. 3008 is a USB hub (USB HUB), which lets data from the PC 3010 pass therethrough unchanged when the printer 1000 prints based on data from the PC 3010, with the data outputted to the printer engine 3004 via a USB 3021. As a result, the connected PC 3010 can carry out printing by exchanging data and signals directly with the print engine 3004. In such a case, the printer 1000 operates as a regular PC printer. 3009 is a power supply connector, which supplies the printer with DC voltage obtained by conversion from a commercial power source by a power supply 3019. PC 3010 is an ordinary personal computer and 3011 is the memory card described above.

It should be noted that the exchange of signals between this control unit 3000 and the printer engine 3004 is carried out by the above-mentioned USB 3021 or an IEEE-1284 bus 3022.

<Digital Camera Summary>

Figure 4:
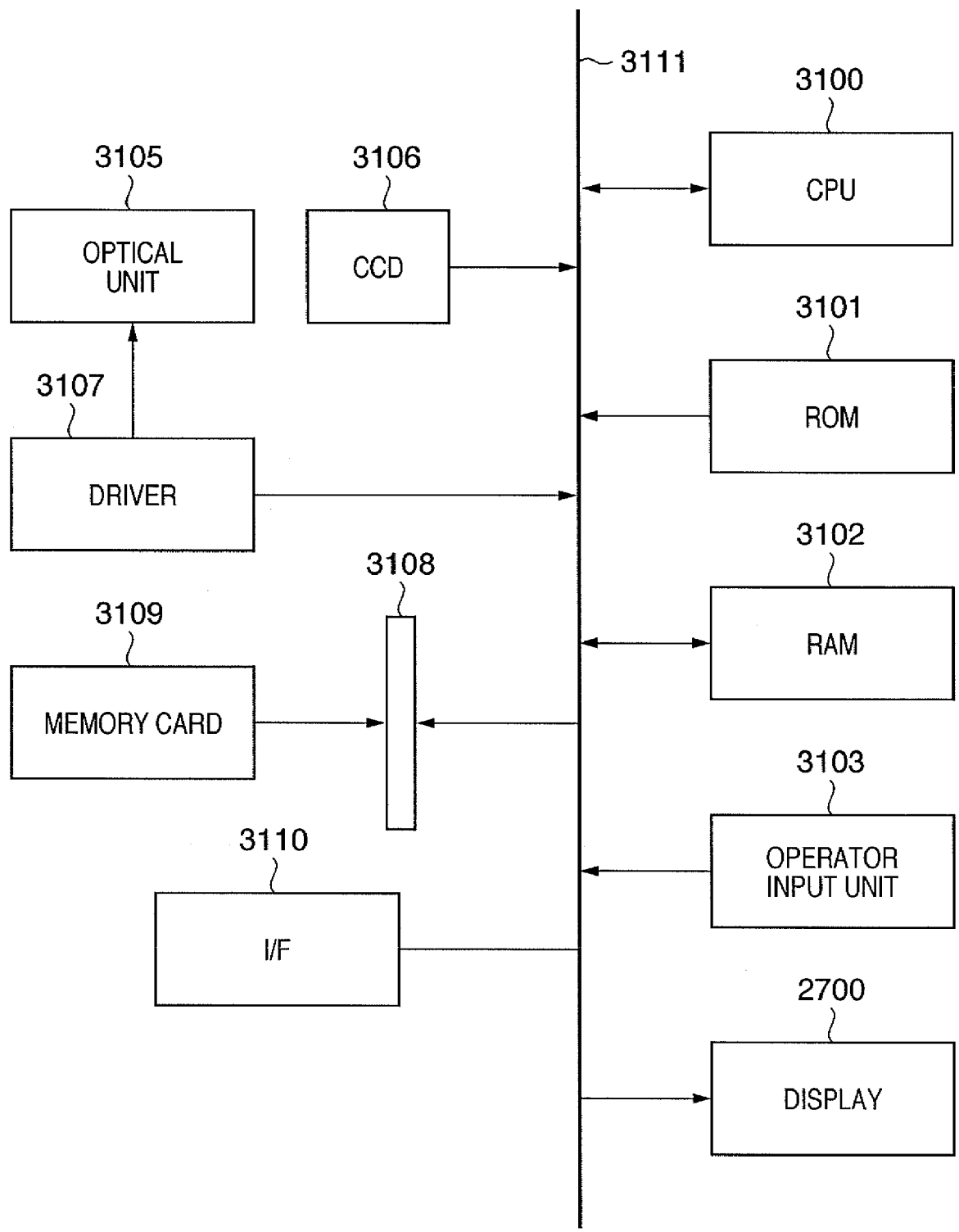
FIG. 4 is a block diagram illustrating an exemplary configuration of a digital camera according to an embodiment of the present invention.

FIG. 4 is a block diagram illustrating an exemplary configuration of the DSC (digital camera) 3012 according to the present embodiment.

The CPU 3100 is responsible for the overall control of the DSC 3012 based on executing the control program stored in the ROM 3101. The RAM 3102 is used as a work area for the CPU 3100. The operator input unit 3103 comprises switches and buttons used by the user to issue various instructions for the DSC 3012, with a shutter button, a mode changeover switch, a selector switch, and a cursor key, etc. included in the operator input unit 3103.

The display 2700 is used to display video images being taken in real time and images taken and stored on the memory card, as well as to display the menu when setting various configuration settings. The optical unit 3105 is composed primarily of lenses and a drive system. The CCD element 3106 converts optical images formed in the optical unit 3105 into electrical signals on a pixel-by-pixel basis. The driver 3107 effects driving control over the optical unit 3105 under the control of the CPU 3100. The connector 3108 electrically connects memory cards and other storage media 3109 with the DSC 3012. The USB interface 3110 is a communication interface used for external devices such as the PC 3010 and printer 1000. The DSC 3012 is usually provided with a slave-side USB interface. A bus 3111 mutually connects the above-described functional blocks in the DSC 3012.

<Direct Printing Summary>

Figure 5:
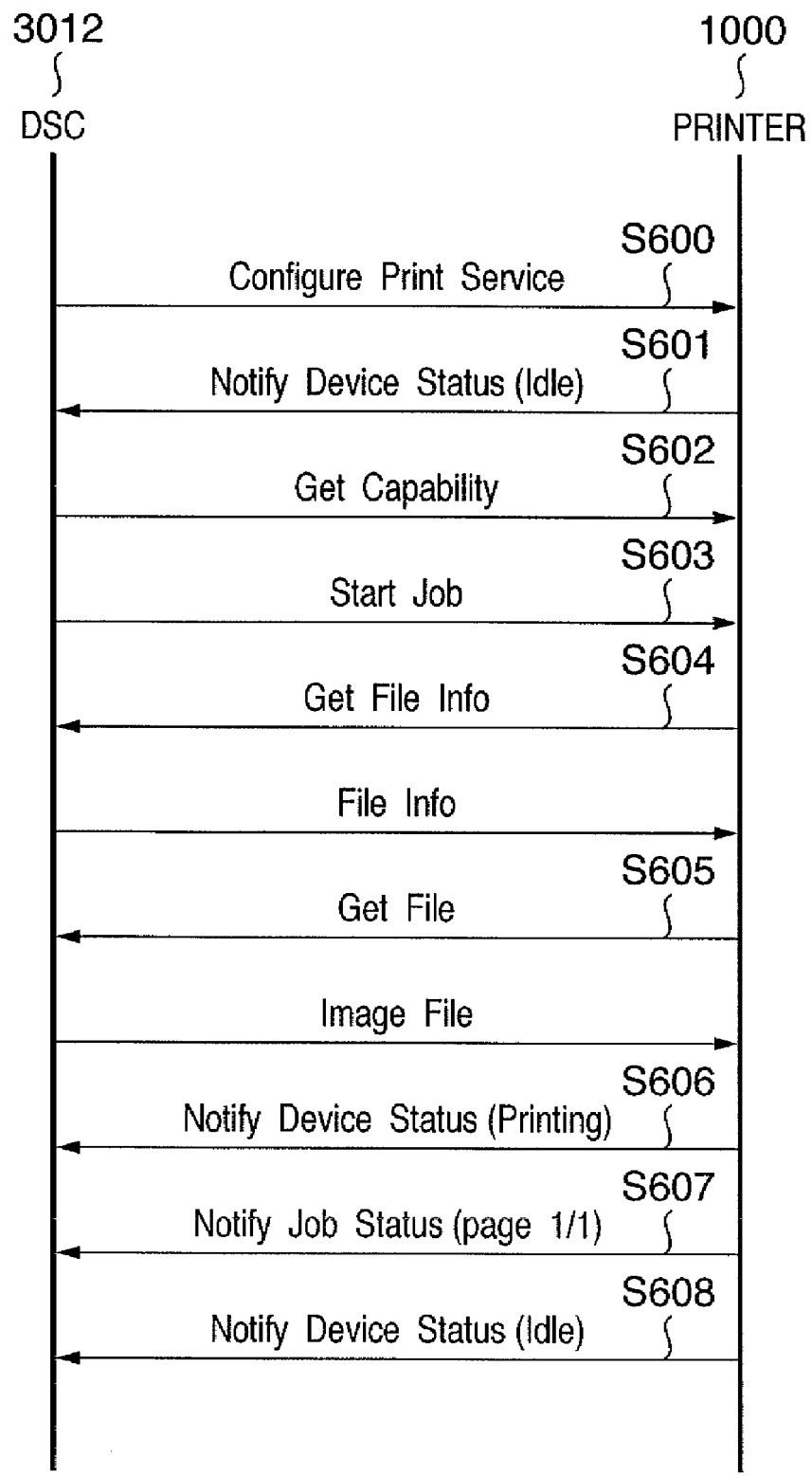
FIG. 5 is a diagram explaining the processing procedure used when a print request is issued by a DSC to a printer in a printing system according to an embodiment of the present invention.

FIG. 5 is a diagram explaining the processing procedure used when a print request is issued by the DSC 3012 to the printer 1000 in the printing system according to the present embodiment. As described above, in the present embodiment, communication between the DSC 3012 and printer 1000 is carried out in accordance with a procedure required by the PictBridge standard.

This processing procedure is carried out after the printer 1000 and DSC 3012 are connected via a USB cable or after mutually confirming through wireless communication that both sides support PictBridge-compatible functionality. First of all, the DSC 3012 sends a "ConfigurePrintService" action to the printer 1000 to check the status of the printer 1000 (S600). In response, the current status (in this case, an "idle" status) of the printer 1000 is notified of by the printer 1000 (S601). Since in this case the status is "idle", the DSC 3012 queries the printer 1000 for capability information using a "GetCapability" action (S602). The DSC 3012 then issues a print start request ("StartJob" action) in accordance with the capability of the printer (S603). It should be noted that the print start request is issued by the DSC 3012 to the printer 1000 on the condition that the "newJobOK" item in the status information received from the printer 1000 in S601 is "True (true)".

In response to this print start request, the printer 1000 uses a "GetFileInfo" action to request file information from the DSC 3012 based on the file IDs of the image data designated for printing (S604). In response to that, the DSC 3012 sends this file information (FileInfo). File size and other information is included in this file information. If the printer 1000 receives the file information and determines that it can be processed, it requests the file from the DSC 3012 using a "GetFile" action (S605). As a result, the image data (ImageFile) of the requested file is conveyed from the DSC 3012 to the printer 1000.

When the printer 1000 receives the image data and initiates a printing process, status information that says "Printing" is conveyed from the printer 1000 to the DSC 3012 using a "NotifyDeviceStatus" action (S606). Then, after printing a single page, a "NotifyJobStatus" action is issued from the printer 1000 and the DSC 3012 is notified of it at the start of processing of the next page. Then, in the case that only a single page is to be printed, when the printing of this single requested page is over, a "NotifyDeviceStatus" action is issued from the printer 1000 to notify the DSC 3012 of the fact that the printer 1000 has gone back into an idle state (S608).

It should be noted that, for instance, during n-up printing, in which multiple (N pages) images are laid out and printed on a single page, a "NotifyJobStatus" action (S607) is sent from the printer 1000 to the DSC 3012 whenever an image of N pages is printed. The timing of issuance of the "NotifyJobStatus" and "NotifyDeviceStatus" actions and the order of acquisition of the image data in the present embodiment are merely an example, and various other cases may arise.

Figure 6:
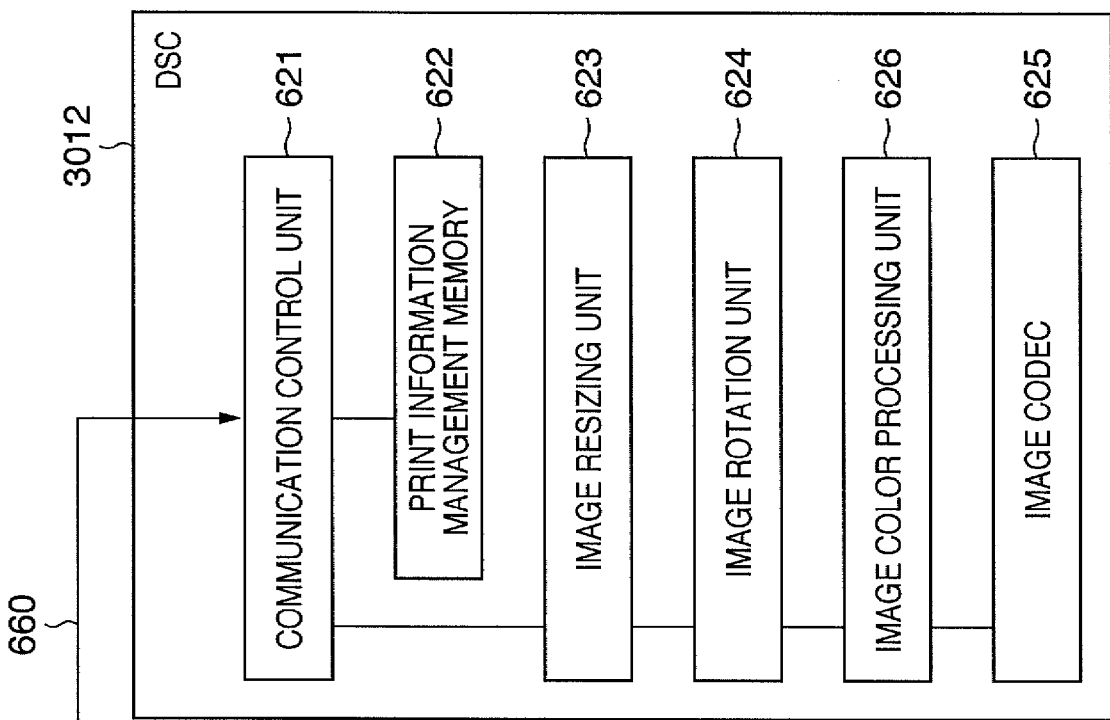
FIG. 6 is a functional block diagram illustrating the functional configuration of a printing system according to an embodiment of the present invention.

FIG. 6 is a functional block diagram illustrating the functional configuration of a printing system according to an embodiment of the present invention. This printing system has a printer 1000 and a DSC 3012, which are interconnected through a USB or another interface 660. It should be noted that this interface 660 can be both a wired interface or a wireless interface, such as Bluetooth™ etc.

In the printer 1000, the communication control unit 610 exercises control over communication via the interface 660. The print information management memory 611 is a memory containing a print buffer and a receive buffer. The image resizing unit 612 performs image scaling. The image rotation unit 613 performs image rotation and tilt correction. The image color processing unit 614 carries out image color conversion. The image codec 615 performs image data compression and decompression. The print control unit 616 comprises the printer engine 3004, etc. It should be noted that, in the present embodiment, the image resizing unit 612, image rotation unit 613, image color processing unit 614, and image codec 615 are implemented in software form based on execution of the programs stored in the program memory 3003a by the DSP 3002.

Moreover, in the DSC 3012, the communication control unit 621 exercises control over communication via the interface 660. The print information management memory 622 is a memory comprising the RAM 3102, which is used for storing processed image data, etc. The image resizing unit 623 performs image scaling. The image rotation unit 624 performs image rotation. The image codec 625 performs image data compression and decompression. The image color processing unit 626 performs color conversion processing. It should be noted that, in the present embodiment, the image resizing unit 623, image rotation unit 624, image codec 625, and image color processing unit 626 are supposed to be implemented in so-called software form based on execution of the programs stored in the ROM 3101 by the CPU 3100.

Furthermore, both in the printer 1000 and in the DSC 3012, one or more software-implemented functional blocks can be implemented using hardware.

<Printing-Related Processing>

Figure 7:
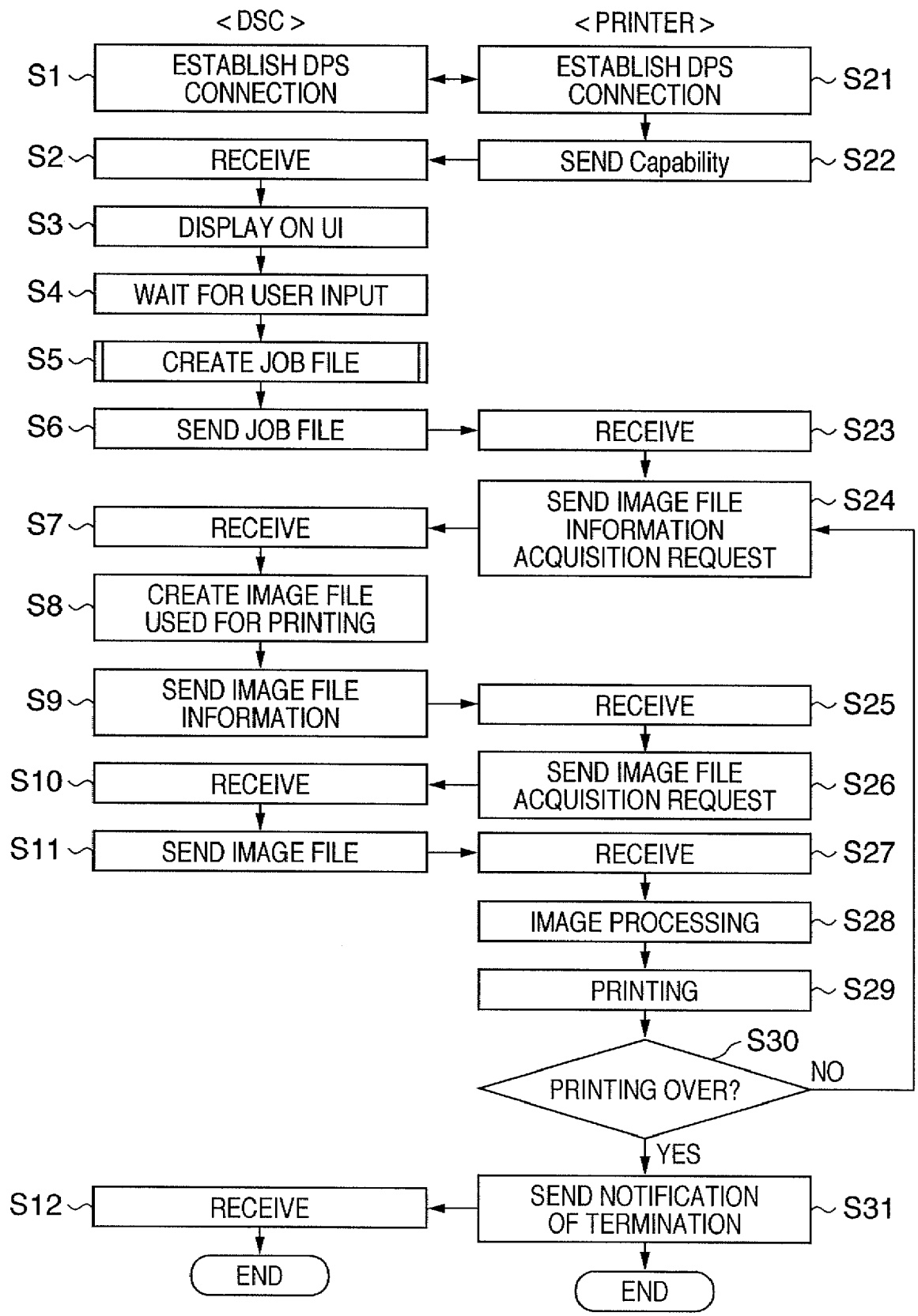
FIG. 7 is a flow chart explaining the processing used when image data is supplied from a DSC to a printer for printing in a printing system according to an embodiment of the present invention.

FIG. 7 is a flow chart explaining the processing used when image data is supplied from the DSC 3012 to a printer 1000 for printing in the printing system according to the present embodiment, in which the digital camera (DSC) 3012 is connected to the printer 1000. In the figure, Steps S1-S12 describe processing in the DSC 3012 and steps S21-S31 describe processing in the printer 1000. It should be noted that, unless clearly stated otherwise, the processing of each step is carried out primarily by the DSP 3002 for steps S1-S12 and by the CPU 3100 for steps S21-S31.

S1 and S21 represent a Discover Process, during which the DSC 3012 and printer 1000 use via the communication control units 610 and 621 to mutually confirm that they both support DPS Specification (PrintBridge)-compatible functionality. During this process, the DSC 3012 queries the printer 1000 for printer status and device information. In response, the current status of the printer 1000 and device information are notified of by the printer 1000. The device information indicates, for instance, the version of the connection protocol, printer vendor name, device model name, etc. Next, as shown in S602 of FIG. 5, the DSC 3012 uses the communication control unit 621 to issue a "Get_Capability" action to request capability information (Capability) from the printer 1000.

When the printer 1000 receives the "Get_Capability" action via the communication control unit 610, in S22, capability information describing the printing capability of the printer 1000 is generated and sent to the DSC 3012.

The DSC 3012 receives this Capability information (S2). The DSC 3012 acquires information regarding the resolution and paper sizes that can be used for printing by the printer 1000. At such time, the printer 1000 computes the number of pixels along the vertical and horizontal axes in the image to be printed. The thus computed number of vertical and horizontal pixels is notified of by the communication control unit 610 of the printer 1000 via the communication control unit 621 of the DSC 3012 using a communication protocol which has been arbitrarily established in advance between the printer 1000 and DSC 3012. The thus notified information regarding the number of vertical and horizontal pixels in the printed image is stored in the RAM 3102 of the DSC 3012.

It should be noted that there may be cases, in which the printer 1000 may of the type that is incapable of notifying the DSC 3012 of the number of vertical and horizontal pixels in the image being printed. In such a case, based on device model information obtained from the printer, such as the vendor name, device model name, and version number, the DSC 3012 can refer to a table etc. to obtain the number of pixels along the vertical and horizontal axes for each printable paper size, information regarding the direction of printing, etc. and compute the number of pixels in the image being printed.

Then, in step S3, the DSC 3012 builds a user interface (UI) based on this Capability information and displays it on the display 2700. Here, it is assumed that, for instance, the printer 1000 has regular paper and photo paper loaded therein, with the paper sizes being A4 and B5. Moreover, it is assumed that 1-up, 2-up and 4-up layouts can be printed both in "bordered" and "borderless" versions. Furthermore, if cropping and date-stamping are possible, these parameters are selectable at will. In addition, items related to functionality not included in the capability information (unavailable in printer 1000) cannot be selected. Based on such information, the CPU 3100 builds a UI used for configuring contents to be printed and displays it on the display 2700.

Next, in S4, the DSC 3012 awaits user instructions via the UI. Using the operator input unit 3103, the user operates the UI to specify the images to be printed and configures the format to be used when printing these images (print settings). The printing format settings include information based on the capability information regarding the printer 1000 received in S2, such as information regarding the number of sheets printed, paper size, whether a date stamp should be used, cropping selection, tilt correction selection, borderless/bordered printing selection, type of layout, whether automatic image correction is to be performed by the printer, etc.

When, for example, tilt correction is selected during such UI operations, the DSC 3012 displays a preview image obtained by rotating the original image by the specified amount in the UI. As a result, the user can interactively specify the direction of rotation and amount of rotation while making sure that the desired results are achieved.

Also, when tilt correction is selected, the DSC 3012 determines the cropping area in accordance with the amount of rotation and displays the cropping area superimposed on the preview image as a rectangular frame or such. By displaying this rectangular frame as a UI that at least permits reduction in size, the user can specify the desired cropping area within a range, wherein the image is not distorted.

Furthermore, as will be explained below, depending on whether tilt correction is selected, control can be exercised so as to deselect the setting concerning automatic image correction in the printer 1000.

When an instruction to start printing is provided by the user through the UI, the DSC 3012 proceeds to S5, various print settings specified through the UI are represented as instructions for the printer, and a print job file is created in order to execute the print request. Here, the print settings include paper size, number of copies to print, bordered/borderless printing, whether date stamping is to be used, information identifying the image files to be printed (e.g. ObjectHandle in PTP), tilt correction and cropping area, automatic image correction, etc. Subsequently, in S6, the DSC 3012 sends the created print job file to the printer 1000 through the communication control unit 621.

The print job file is received by the printer 1000 in S23. Next, in S24, the printer 1000 analyzes the received print job file and carries out preparation for printing. Subsequently, an "Image File Information Acquisition Request" is issued for the DSC 3012 in connection with the image files to be printed recorded in the print job file.

It should be noted that, for instance, in case of PictBridge, the "Image File Information Acquisition Request" corresponds to a "GetObjectInfo" operation stipulated in the PTP (Picture Transfer Protocol). However, the purpose of issuing an "Image File Information Acquisition Request" in this embodiment consists in conveying the time of creation of the image files from the printer 1000 to the DSC 3012.

Subsequently, in S7, when the DSC 3012 receives the "Image File Information Acquisition Request", control proceeds to S8, and processing is executed so as to create image files used for printing to be sent to the printer 1000. It should be noted that the image files created here may be created in advance, between the time when the job file is created in S5 and the request is received in S7.

As described below, the DSC 3012 of the present embodiment is characterized by generation of an image file for printing accompanied by tilt correction. The processing of S8 is explained in detail below. Next, in S9, the DSC 3012 sends information on the image files used for printing created in S8 (image file names, data size, etc.) to the printer 1000 as a response to the "Image File Information Acquisition Request".

When the printer 1000 receives the image file information in S25, the names of the image files contained therein are specified and a request to acquire image files used for printing is sent to the DSC 3012 (826). When the DSC 3012 receives the request to acquire the image files (S10), in S11, the requested image files used for printing are sent to the printer 1000.

When the printer 1000 receives an image file for printing in S27, the image data is decoded and image processing is performed, converting it to a format printable by the printer 1000 (S28). Subsequently, in S29, the printer 1000 carries out printing based on the image data obtained by conversion. In S30, the printer 1000 determines whether the converted image data has been completely printed. If printing is not complete at this point, this may be, for example, such a case that sufficient buffer space cannot be secured for storing the received image data used for printing in the printer 1000 so that the image file is received in portions and processed in S27. In such a case, control returns to S24, an "Image File Information Acquisition Request" is again sent to the DSC 3012 and, in accordance with the same procedure as the one described above, in S27, partial data of the image data contained in the image file is received and printed.

If the printing of the image data contained in the image file for printing is over in S30, control proceeds to S31, and the printer notifies the DSC 3012 of the fact that the printing of the image file is over. When the DSC 3012 receives the notification of the end of printing in S12, the process is terminated.

Figure 8:
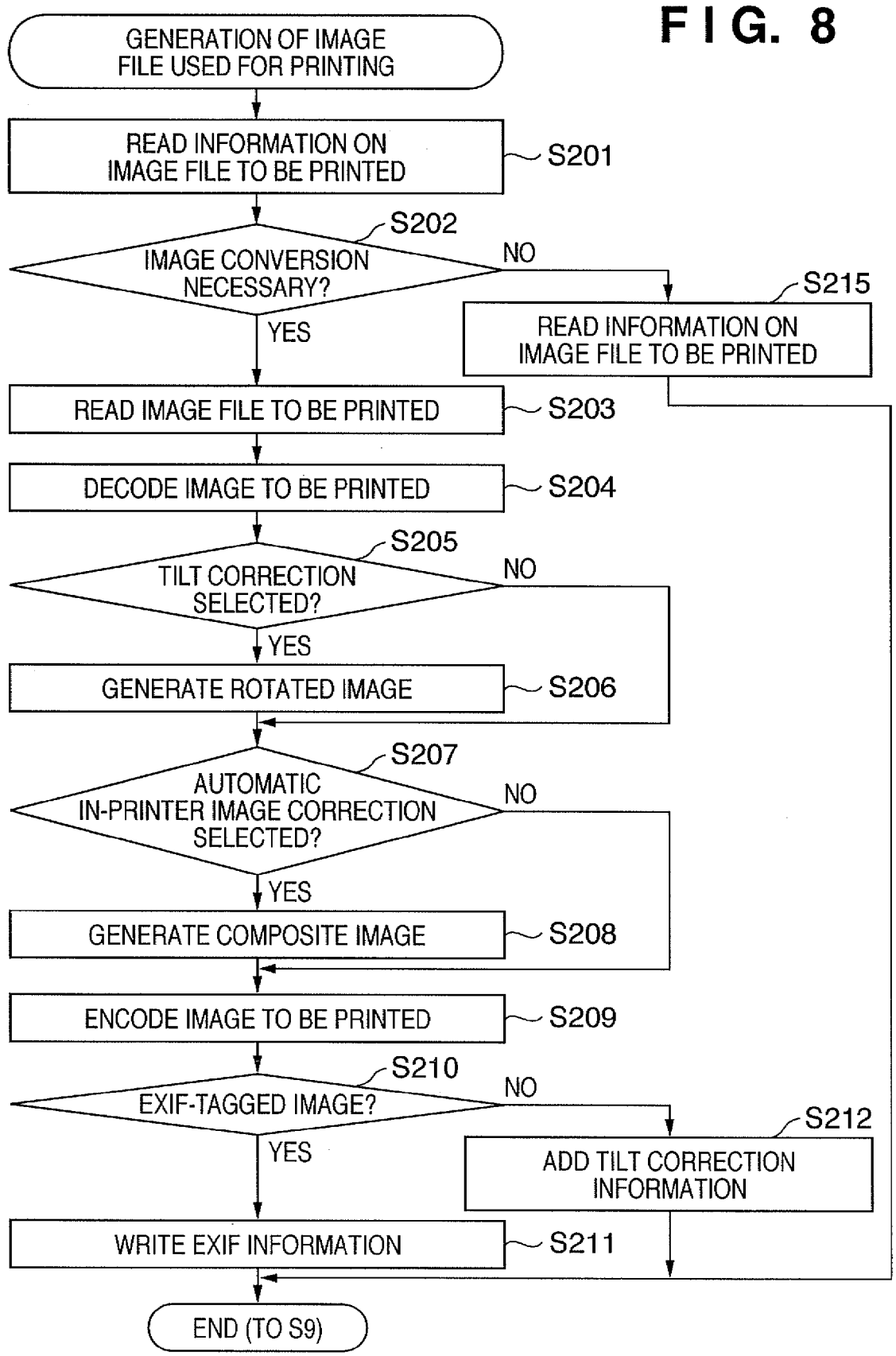
FIG. 8 is a flow chart explaining the process of creation of image files used for printing in a DSC corresponding to the processing of S8 in FIG. 7.

FIG. 8 is a flow chart explaining the process of generation of image files used for printing in the DSC 3012 corresponding to the processing of S8 in FIG. 7.

As explained above, this process is initiated when the DSC 3012 receives an "Image File Information Acquisition Request" (S24) from the printer 1000 in S7.

First of all, in S201, the DSC 3012 acquires information on the images included in the print job file generated in S5, on which the acquisition request received from the printer 1000 is based. Next, based on the print settings and the image data contained in the image files to be printed, the DSC 3012 determines whether these image data require resizing, rotation, cropping, or other image conversion operations (S202). If it is determined that no image conversion processing is necessary, the DSC 3012 reads information on the image files to be printed from the storage medium 3109 (S215). Subsequently, the process of generation of the image file for printing is terminated and, in S9, the image file information is sent to the printer 1000.

On the other hand, if in S202 it is determined that processing such as image conversion etc. for the purpose of tilt correction of image data is necessary, the DSC 3012 reads the images files to be printed from the storage medium 3109 (S203). Then, if decoding is necessary, such as if the image data of the image files has been encoded, etc., the data is decoded by the image codec 625 and converted to the original image data (S204). If decoding is not necessary, S204 is skipped.

Next, in S205, based on the image date to be printed (original image data) and print settings, the DSC 3012 determines whether the image data requires tilt correction. If it is determined to be necessary, an image corrected for tilt is generated using the image rotation unit 624 to rotate the original image data by the specified amount in the specified direction (S206).

Next, the DSC 3012 checks whether printer-based automatic image correction has been selected in the print settings (S207), with control passing to S209 if it has not been selected. On the other hand, if printer-based automatic image correction has been selected, a composite image generation process is carried out in S208.

FIGS. 9A-9K are diagrams used to explain the process of generation of composite images carried out in S208 of FIG. 8 by the DSC 3012 according to the present embodiment.

Figure 9A:
FIG. 9A-FIG. 9K are diagrams used to explain the process of generation of composite images carried out by the DSC according to the first embodiment of the present invention.
Figure 9B:

FIG. 9A illustrates an original image to be printed (e.g. 4992 pixels (width)×3328 pixels (height)). A rotated image, such as the one shown in FIG. 9B, is obtained, for instance, if this original image is subjected to a 10-degree tilt correction in the counterclockwise direction. In such a case, regions a-d are generated which do not overlap with the region (indicated by the frame 801) corresponding to the original image prior to the rotation.

Figure 9C:
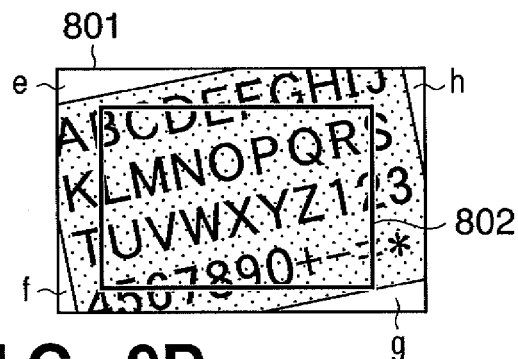

On the other hand, blank regions e-h are generated, as shown in FIG. 9C, within the region corresponding to the original image. The largest possible rectangular region, such as the one indicated by the frame 802, which has the same aspect ratio as the rectangular region corresponding to the original image and does not include the blank regions, is automatically designated as the cropping area by the DSC 3012 in order to prevent the blank regions e-h from being printed by the printer 1000. As described above, this automatically set cropping area can be modified by the user, with the printer 1000 is notified of the finally determined cropping area as part of the print settings using the print job file.

Figure 9D:
Figure 9E:
Figure 9G:
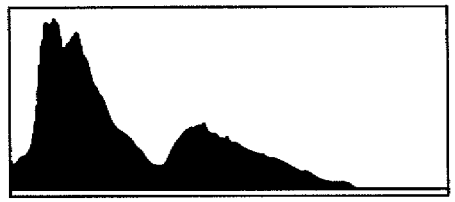
Figure 9J:
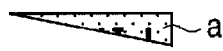
Figure 9K:
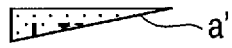
Figure 9H:
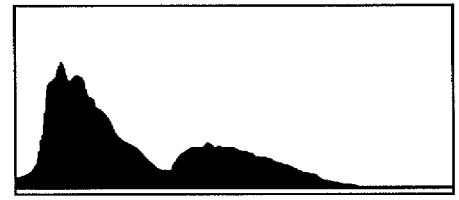

FIG. 9G is a histogram illustrating the distribution of luminance values of the pixels contained in the original image of FIG. 9A. On the other hand, FIG. 9H is a histogram generated in similar way from the entire image of FIG. 9C. In FIG. 9C, the regions corresponding to the non-overlapping regions a-d changed to the blank regions e-h, as a result of which the histogram of FIG. 9H is different from the histogram of FIG. 9G.

Figure 9I:
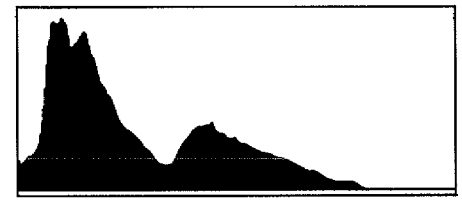
Figure 9F:

As a result, if the printer 1000 carries out automatic image correction based on the histograms, the correction results based on the histogram of FIG. 9G will not be the same as the correction results based on the histogram of FIG. 9H. For instance, if cropping is selected using the frame 802, as shown in FIG. 9C, the correction results (output results) will be different, as shown in FIG. 9E and FIG. 9F. Moreover, the blank regions e-h also affect image correction processing that does not rely on the use of histograms, for example, automatic white balance processing.

In order to resolve such problems, the DSC 3012 of the present embodiment generates the following composite image as image data used for printing if both tilt correction and printer-based automatic image correction have been selected.

Specifically, composite image data obtained by including the pixels of the non-overlapping regions a-d, which were not included into the image data used for printing in the past as a result of tilt correction, into the blank regions e-h is generated as image data used for printing.

Basically any method can be used for compositing so long as the pixels of the non-overlapping regions a-d are included into the blank regions e-h. The simplest method is probably one, in which the pixels of the non-overlapping regions are composited so as to be included in any of the blank regions.

In the present embodiment, compositing is carried out by considering the relationship between the shape of the non-overlapping regions and the shape of the blank regions, generating partial images by geometric transformation of the non-overlapping regions, and fitting the partial images into the blank regions of the corresponding shape. Specifically, for instance, in order to composite the non-overlapping region "a" with the blank region "e", a partial image "a'" (FIG. 9K), which is produced by the right-to-left flipping of the non-overlapping region "a" (FIG. 9J), is generated and composited with the blank region "e". Using the same process, partial images b'-d' are generated from the non-overlapping regions b-d and composited with the blank regions f-h.

The composite image illustrated in FIG. 9D is obtained by performing such compositing. In other words, image data in a exiting region that exits the region corresponding to the original image due to the rotation is copied in blank regions of the rotated image. That is, the blank regions in the rotated image are filled with data of the original image. This allows the whole image data of the original image to be included in the rotated image without any lack that FIG. 9I is the histogram of the image of FIG. 9D. If all the pixels of the non-overlapping regions a-d are composited with the composite image, then the histogram of the original image (FIG. 9G) will match the histogram of the composite image (FIG. 9I). As a result, even though the automatic image correction feature of the printer 1000 is dependent on image histograms, the same correction results can be obtained regardless of the presence or absence of tilt correction in the DSC 3012 and the amount of rotation.

Furthermore, fitting the partial images produced by flipping the non-overlapping regions into the blank regions of the corresponding shape makes the positional relationship of the pixels closer to that of the original image in comparison with randomly compositing the pixels contained in the non-overlapping regions with the blank regions. For this reason, effects upon the correction results can be minimized even when image correction is carried out in the printer based upon subject matter determination etc. using information other than histograms, such as colors.

It should be noted that when there is image conversion processing required in addition to tilt correction, the conversion processing can be applied to the composite image. Naturally, it may be carried out prior to rotated image generation as well.

In S209, the DSC 3012 uses the image codec 625 to encode the image data that has undergone image conversion processing. The method of encoding, which will not be explained in detail here, is an encoding method that the printer 1000 can handle, such as reversible compression typically represented by PackBits etc., non-reversible compression represented by JPEG, etc.

In S210, the DSC 3012 determines whether the encoded image data is EXIF tagged image data, and, if EXIF tags are present, in S211, the EXIF information is updated by matching with the contents of the image data conversion process carried out in S204-S209.

On the other hand, if it is determined in S210 that there are no EXIF tags, in S212, the DSC 3012 attaches tilt correction information (e.g. information that can identify the rotational direction and the amount of rotation) to the encoded image data.

The DSC 3012 uses the thus generated encoded image data to create an image file for printing. Subsequently, response data produced in response to the "Image File Information Acquisition Request" from the printer 1000 are created based on the generated image file for printing and used as a response (S9 of FIG. 7). It should be noted that the generated image file for printing is temporarily stored in a data area used for data transfer (e.g. a predetermined area of the RAM 3102).

When the "Image File Acquisition Request" from the printer 1000 is received in S10, the DSC 3012 sends the image file used for printing stored in the transfer data area to the printer 1000 via the communication control unit 621 and communication control unit 610 (FIG. 7, S11).

Alternate Embodiment 1

It should be noted that, during the process of composite image generation in S208 of FIG. 8, the pixels contained in the blank regions may be different from the pixels of the non-overlapping regions. For example, achromatic pixels, or more specifically, constant-density gray pixels or gray pixels of varying density, can be utilized.

Gray pixels of intermediate density (e.g. gray pixels with a value of 128 on the 256-level gray scale) can be utilized as the constant-density gray pixels. This makes it more likely that the difference between correction without rotation and correction accompanied by rotation will be reduced during the process of automatic in-printer image correction.

Alternatively, constant-density gray pixels may be used as gray pixels having a density (brightness) equal to the average of the brightness of the pixels in all the non-overlapping regions. In this case, the density of the entire histogram can be made closer to the original image. The difference between correction that does not involve a rotation process and correction accompanied by a rotation process can then be made even smaller than when a constant density is predetermined in advance.

Moreover, instead of constant-density gray pixels, it is also possible to use gray pixels of varying density. More specifically, multiple gray pixels evenly distributed between the lowest and the highest density may be utilized. At such time the density of the entire histogram can be made practically identical to that of the original image while enabling correction that more closely resembles original image correction that does not involve a rotation process because it is not the density of just a portion of the pixels that stands out in this case.

The use of the gray pixels makes the accuracy of the automatic in-printer image correction process decline in comparison with the case, in which the pixels contained in the non-overlapping regions are used. However, since the process of generation of partial images from the non-overlapping regions is not required, the memory capacity of the DSC 3012 can be saved and the processing load on the CPU 3100 can be alleviated, which makes the use of this method quite efficient in case of DSCs with limited resources.

As described above, in accordance with the present embodiment, when images obtained by rotating original images are supplied to the printing apparatus from the image-providing apparatus, the supplied images are produced by compositing gray pixels and pixels from the non-overlapping regions generated by the rotation with the blank regions generated by the rotation. This makes it possible to minimize the effects of the blank regions even when automatic image correction is performed based on the colors and histograms of the images in the printing apparatus. Accordingly, it becomes possible to significantly minimize variation in the output even when images produced by subjecting the same original image to tilt correction using different tilt amounts undergo automatic image correction in the printing apparatus.

In particular, using the pixels of the non-overlapping regions, which initially were part of the pixels of the original image, as the pixels composited with the blank regions makes it possible to keep the histogram of the entire image between the original image and the image corrected for tilt. For this reason, the effects of tilt correction on automatic image correction based on the histogram of the entire image can be eliminated.

Moreover, compositing based on fitting partial region images generated by flipping the non-overlapping regions with the blank regions of the corresponding shapes is also effective in terms of minimizing the effects that tilt correction has on automatic image correction based on image information other than histograms.

Moreover, even when tilt correction is carried out, the printing apparatus is supplied with the data of the entire image, and, therefore, there are practically no effects on the histograms even if the cropping position and size vary. For this reason, stable output quality can be maintained even when the camera is connected to a printing apparatus that performs brightness and contrast adjustment based on automatic image correction. Furthermore, supplying the data of the entire image, and not only the data of the cropping area, makes it possible to use image data outside of the cropping frame during printing. For this reason, even in case of a printing apparatus that prints within a wider range than the actual paper size in order to eliminate borders, the image within the scope specified by the cropping frame does not have to be enlarged and the cropping area is output without blanks.

Furthermore, in the present embodiment, a composite image is generated only if both tilt correction and automatic in-printer image correction have been selected, which enables acceleration and alleviation of processing if automatic in-printer image correction has not been selected.

Second Embodiment

In the first embodiment, when images corrected for tilt were supplied to the printer, the composite images supplied were obtained by compositing the blank regions generated by tilt correction with gray pixels and the pixels of the non-overlapping regions generated by the tilt correction.

In the present embodiment, the effects of tilt correction on automatic in-printer image correction based on the histogram of the entire image are minimized by supplying the printer not with composite images, but instead, with images corrected for tilt (not composite images) and histograms of the original images.

The configuration of the DSC 3012 in the present embodiment may be similar to that of the first embodiment, with the only difference consisting in the processing in S208 (FIG. 8) in the process of generation of the image file used for printing. In other words, the histogram of the original image (either for each RGB channel separately or for all the channels together) is generated instead of generating a composite image. Naturally, the histogram may be generated before generating a rotated image in S206, and in such a case the processing of S208 may consist in configuring information indicating that a histogram needs to be sent to the printer.

Subsequently, when an image file is generated, histogram information in arbitrary form is included, for instance, in the header of the file.

On the other hand, the configuration of the printer may be similar to that of the first embodiment. When the DSP 3002 of the printer 1000 acquires the image file used for printing from the DSC 3012, EXIF information or tilt correction information is used to confirm that the image data contained in the image file used for printing has undergone tilt correction. Subsequently, for instance, when an automatic image correction process based on the histogram of the image data is carried out by the image color processing unit 614, the histogram recorded in the image file used for printing is read out and used without generating a histogram from the image data contained in the image file used for printing.

Thus, in accordance with the present embodiment, it is possible to obtain correction results independent of the amount of tilt correction when histogram-based automatic image correction is performed on the printer side because the printer apparatus is supplied with the histogram of the image prior to tilt correction and the image after the tilt correction. Moreover, since a histogram of the original image may be generated instead of performing an image compositing process in the image-providing apparatus, processing can be alleviated and, in addition, memory capacity can be saved as compared with image compositing.

Third Embodiment

In the second embodiment, the printing apparatus was supplied with histograms of the original images and images corrected for tilt. By contrast, in the present embodiment, the printing apparatus is supplied with tilt correction-related information and images corrected for tilt. It is sufficient that the "tilt correction-related information" is information that can identify, for instance, the rotational direction and the amount of rotation of an image. The configuration of the DSC 3012 in the present embodiment may be similar to that of the first embodiment, but the processing that takes place in S207 and S208 in the process of generation of an image file used for printing is not required. The tilt correction-related information may be recorded in the image file in S211 and S212.

Since the number of pixels along the vertical and horizontal axes of an image can be figured out on the printer side from the EXIF information etc., the position and size of the blank regions contained in the image corrected for tilt can be obtained if the rotational direction and amount of rotation of the image are known.

Subsequently, the information of the pixels of the regions considered as blank regions is not used when automatic image correction is performed in the printer 1000. As a result, the effects that the tilt correction amount-dependent variation in the size of the blank regions has on the correction results can be eliminated and tilt correction amount-dependent variation in the correction results can be minimized.

Thus, in accordance with the present embodiment, the image-providing apparatus supplies the printing apparatus with information regarding tilt correction and images that have been corrected for tilt. Moreover, the printing apparatus identifies blank regions contained in the images corrected for tilt from the tilt correction-related information and does not use the information of the blank regions in the automatic image correction process. Such a procedure makes it possible to minimize the effects that the blank regions have on the results of the automatic image correction process in the printing apparatus.

In the present embodiment, the processing load on the image-providing apparatus side is extremely small and basically limited to image rotation. For this reason, we can say that, the techniques used are suited to low-capacity image-providing apparatus more than the second embodiment.

Fourth Embodiment

Figure 10:
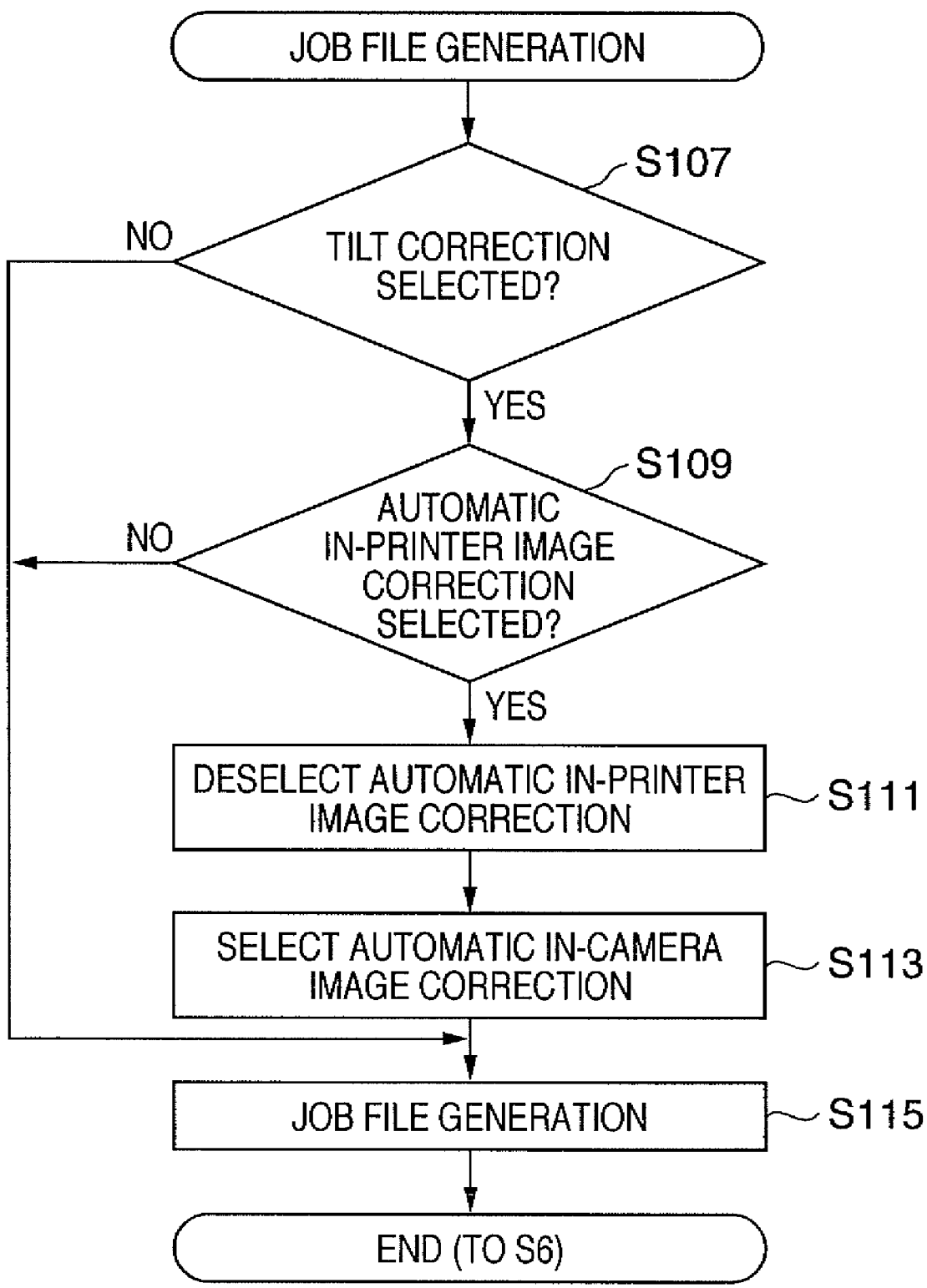
FIG. 10 is a flow chart explaining the process of print job file creation performed by the DSC 3012 in the printing system according to the fourth embodiment of the present invention.

FIG. 10 is a flow chart explaining the process of print job file creation performed by the DSC 3012 in the printing system according to the fourth embodiment of the present invention. The process corresponds to the process of S5 in FIG. 7 and is implemented by issuing an instruction to start printing through the UI.

The DSC 3012 of the present embodiment is assumed to be a DSC 3012 capable of using the image color processing unit 626 to perform the same automatic image correction as the printer. In addition, if both automatic in-printer image correction and tilt correction have been selected, instead of performing automatic image correction in the printer, automatic image correction is performed in the DSC 3012, with the corrected images supplied to the printer. Moreover, a job file is generated, in which the automatic in-printer image correction selection set by the user via the UI is deselected.

First of all, in S107, the DSC 3012 checks whether tilt correction has been selected by the user and passes to S115 if not. On the other hand, if it has been selected, control proceeds to S109, where it is determined whether automatic in-printer image correction has been selected.

If automatic in-printer image correction has been selected, the DSC 3012 deselects the automatic image correction selection in the print setting in S111. Subsequently, in S113, the parameter used for specifying automatic image correction in the DSC 3012 (automatic in-camera image correction) is registered, for example, in a predetermined address of the RAM 3102.

In S115, the DSC 3012 uses parameters required for printing to generate a print job file as described in the first embodiment. Needless to say, if the automatic image correction selection in the printer has been deselected in S111, this is reflected in the job file at such time.

After that, in S207 of the process of generating image data used for printing illustrated in FIG. 8, the DSC 3012 checks whether automatic in-camera image correction has been selected instead of automatic in-printer image correction. Subsequently, if it has been selected, in S208, the image color processing unit 626, etc. is used as correction unit to apply original image-based automatic image correction to the rotated image, generating image data used for printing.

It should be noted that, before automatic in-printer image correction is deselected in S111, a message notifying the user of deselecting automatic image correction on the printer side and performing automatic image correction on the camera side may be output in the form of a display or a voice message.

Moreover, the configuration may be such that only the automatic in-printer image correction is deselected in S111 and automatic in-camera image correction is not selected in S113. That is, control can be exercised so as to prohibit automatic in-printer image correction if tilt correction has been selected. In such a case, the correction results expected by the user are not achieved, but it is possible to avoid a situation, wherein white balance is destroyed and image brightness is corrected the wrong way because the blank regions are treated as correct pixels by the printer.

Thus, in accordance with the present invention, if both tilt correction and automatic in-printer image correction have been selected, automatic in-printer image correction is deselected and automatic image correction is carried out on the camera side, thereby permitting original image-based image correction independent of the amount of tilt correction. For this reason, the effects that the blank regions created by tilt correction have on the correction results and print output can be minimized.

Other Embodiments

The above-described embodiments can be implemented in software form using the computer (or CPU, MPU, etc.) of the system or apparatus.

Accordingly, a computer program supplied to a computer in order to implement the above-described embodiments on the computer represents an implementation of the present invention. In other words, a computer program used to implement the functionality of the above-described embodiments represents an aspect of the present invention.

It should be noted that the computer program used to implement the above-described embodiments may be in any form so long as it is computer-readable. It can be represented by, but is not limited to, object code, an interpreter-executed program, script data supplied to an OS, etc.

The computer program used to implement the above-described embodiments is supplied to computers on storage media or through wired/wireless communication. The storage media used to supply the program include, for example, floppy disks, hard disks, magnetic tape and other magnetic storage media, MO, CD, DVD and other optical/magneto-optical storage media, nonvolatile semiconductor memory, etc.

Methods used to supply the computer program over a wired or wireless connection include methods utilizing a server on a computer network. In such a case, a data file (program file) that can serve as a computer program implementing the present invention is stored on the server in advance. The program file may be executable or source code.

The program file is supplied to client computers accessing the server by way of downloading the program file. In such a case, the program file may be divided into multiple file segments, with the file segments residing on different servers.

In other words, the server equipment that supplies the program file implementing the above-described embodiments to client computers is also an aspect of the present invention.

In addition, it is also possible to distribute storage media containing the computer program used to implement the above-described embodiments in encrypted form, supply users meeting predetermined criteria with information regarding a key that can decrypt the encryption, and allow the users to install it on their computers. Information regarding the key can be supplied, for example, by making it available for downloading from a home page via the Internet.

Moreover, the computer program used to implement the above-described embodiments may utilize the functionality of the OS already running on the computer.

Furthermore, part of the computer program used to implement the above-described embodiments may be in the form of firmware on an expansion board, etc. installed in the computer and may be intended for execution by the CPU provided in the expansion board, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-071200 filed on Mar. 19, 2007, which is hereby incorporated by reference herein its entirety.

What is claimed is:

1. An image-providing apparatus providing image data used for printing to a printing apparatus, the image-providing apparatus comprising:
   a generation unit adapted to generate image data used for printing from data of an original image; and
   a communication unit adapted to provide the image data used for printing to a connected printing apparatus,
   wherein, when the original image is rotated during generation of the image data used for printing, the generation unit, along with obtaining a rotated image by rotating the original image, generates image data used for printing by including achromatic pixels or pixels from non-overlapping regions that do not overlap with a region corresponding to the original image within the rotated image in blank regions of the rotated image, and
   wherein the generation unit generates partial images by geometric transformation of the non-overlapping regions and generates the image data used for printing by compositing the generated partial images with regions of corresponding shapes among the blank regions.

2. The image-providing apparatus according to claim 1, wherein the achromatic pixels have a density equal to the average of the brightness of all the pixels contained in the non-overlapping regions.

3. The image-providing apparatus according to claim 1, wherein the generation unit generates the rotated image as the image data used for printing when automatic image correction in the printing apparatus has not been selected in the print setting used when printing the image data used for printing with the printing apparatus.

4. A printing system in which an image-providing apparatus and a printing apparatus are mutually communicable,
   wherein the image-providing apparatus comprises:
   (a) a generation unit adapted to generate image data used for printing from data of an original image, which, when the original image is rotated during generation of the image data used for printing, obtains a rotated image by rotating the original image and, along with that, generates image data used for printing by including achromatic pixels or pixels from non-overlapping regions that do not overlap with a region corresponding to the original image within the rotated image in blank regions of the rotated image, and
   (b) a communication unit adapted to provide the image data used for printing to a connected printing apparatus,
   wherein the generation unit generates partial images by geometric transformation of the non-overlapping regions and generates the image data used for printing by compositing the generated partial images with regions of corresponding shapes among the blank regions, and wherein the printing apparatus comprises an automatic correction unit adapted to automatically correct the image data used for printing.

5. A control method for an image-providing apparatus providing image data used for printing to a printing apparatus, comprising the steps of:

generating image data used for printing from data of an original image, and effecting communication to provide the image data used for printing to a connected printing apparatus by communication unit, wherein, when the original image is rotated during generation of the image data used for printing, the generating step involves obtaining a rotated image by rotating the original image and, along with that, generating image data used for printing by including achromatic pixels or pixels from non-overlapping regions that do not overlap with a region corresponding to the original image within the rotated image in blank regions of the rotated image, wherein the generating step generates partial images by geometric transformation of the non-overlapping regions and generates the image data used for printing by compositing the generated partial images with regions of corresponding shapes among the blank regions.

* * * * *